March 20, 1951 S. E. HEYMANN 2,545,616
HEATER
Filed Feb. 9, 1946 2 Sheets-Sheet 2

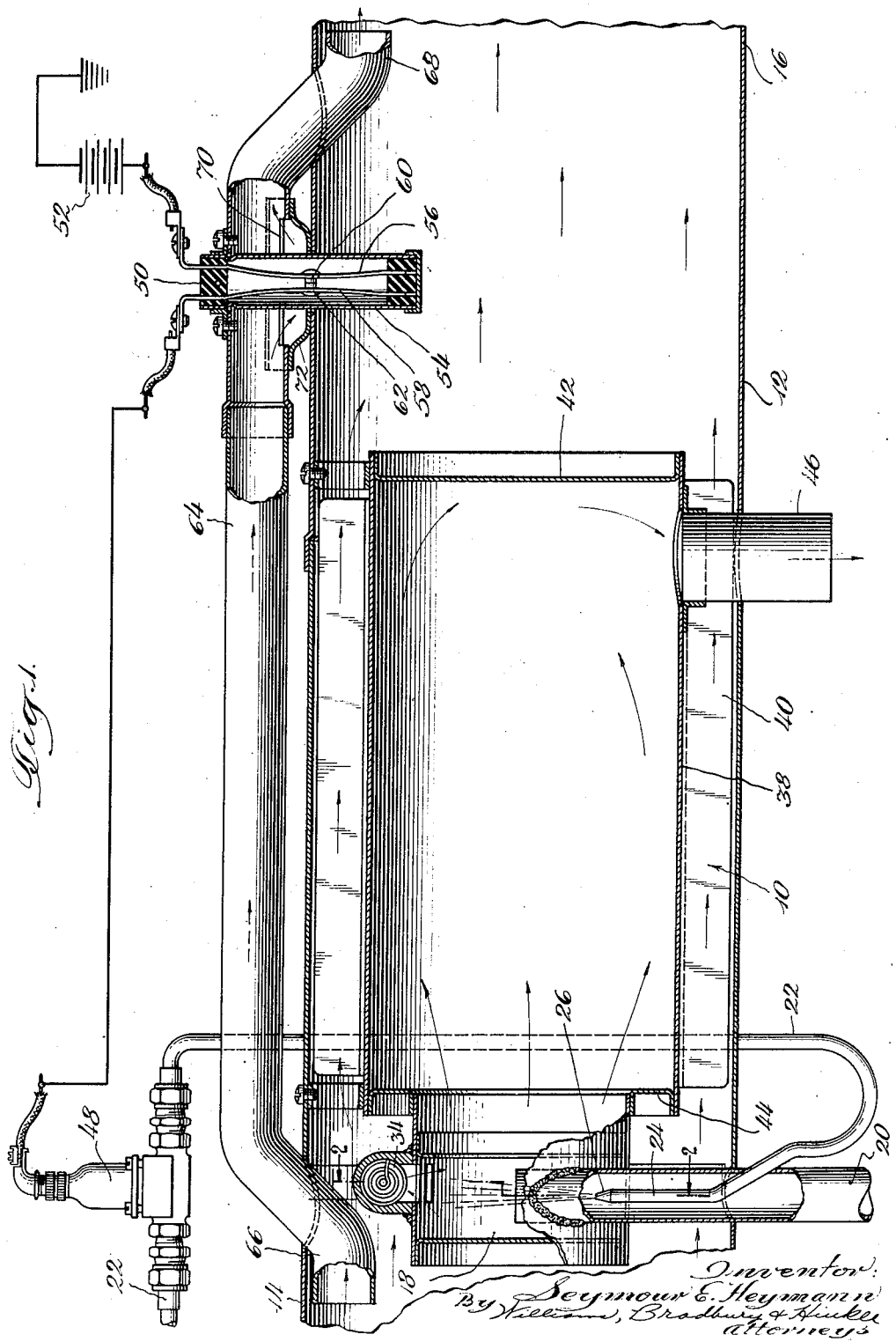

Inventor:
Seymour E. Heymann
By Williams, Bradbury & Hinkle
attorneys

Patented Mar. 20, 1951

2,545,616

UNITED STATES PATENT OFFICE 2,545,616

HEATER

Seymour E. Heymann, Indianapolis, Ind., assignor to Stewart-Warner Corporation, Chicago, Ill., a corporation of Virginia Application February 9, 1946, Serial No. 646,643

5 Claims. (Cl. 236—10)

My invention relates to heaters and is more particularly concerned with but not limited to heaters for aircraft.

An object of my invention is to provide a new and improved aircraft heater whose output automatically varies inversely with the temperature of the atmosphere so that the colder the atmosphere the greater the heat output of the heater.

Another object of my invention is to provide a new and improved heater having simple and inexpensive control mechanism for regulating the output of the heater.

Another object of my invention is to provide a new and improved heater having simple and inexpensive control mechanism whereby the output of the heater may be varied over a wide range either by manual or thermostatic control mechanism.

Other objects and advantages will be apparent as the description proceeds.

In the drawings:

Fig. 1 is a longitudinal sectional view through a heater embodying a preferred form of my invention;

Figure 2:
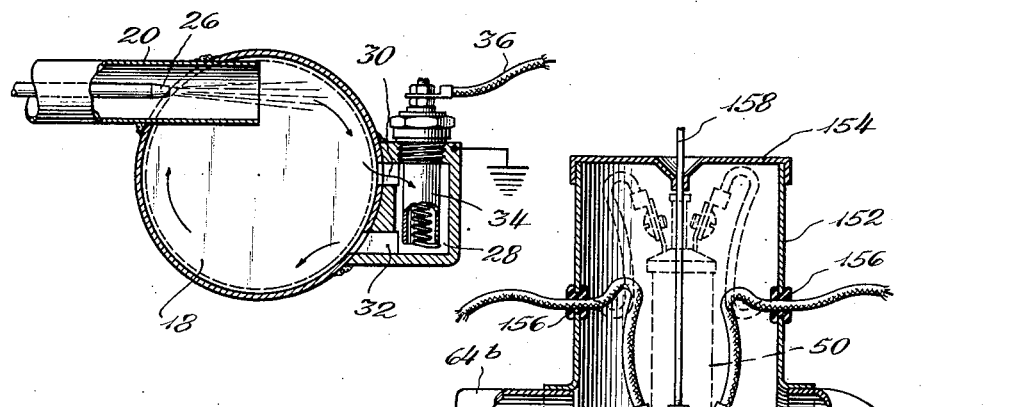
Fig. 2 is a transverse sectional view through the combustion chamber and is taken on the line 2—2 of Fig. 1.

In that form of my invention shown in Figs. 1 and 2 of the drawings I have illustrated a heater indicated generally by reference character 10 as being mounted in a duct 12 having an inlet end 14 supplied with atmospheric air by a ram, blower or in any other manner. The outlet end 16 of the duct 12 leads to the cabin of an aircraft or other space to be heated and preferably is provided with a plurality of properly arranged grills or outlets through which the heated air is distributed and discharged into the cabin or other space.

The heater 10 may be of any suitable type of internal combustion heater and is illustrated as having a combustion chamber 18 which is circular in cross section and which is supplied with combustion air through a pipe 20 connected to a ram, blower or other suitable source of air. Fuel such as gasoline or other hydrocarbon is furnished to the heater through a fuel supply pipe 22 having a portion 24 enclosed within the combustion air pipe 20 and terminating in a nozzle 26 spaced from the combustion end of the air pipe 20, as clearly shown in Fig. 2. The portion 24 of the fuel supply pipe is located in that portion of the combustion air pipe 20 which passes from the exterior of the duct 12 to the combustion chamber 18 so that any drip from the nozzle 26 cannot mix with and contaminate any ventilating air supplied to the cabin or other space by way of the duct 12.

As best shown in Fig. 2, a pocket 28 is located at one side of the combustion chamber and communicates therewith through openings 30 and 32. A hot wire igniter plug 34 is located in the pocket 28 and is connected by wire 36 with any suitable source of electrical current. In the operation of the heater the combustible mixture created in the combustion chamber by the intermixing of the fuel sprayed from the nozzle 26 with the combustion air supply by pipe 20 whirls about the longitudinal axis of the chamber, and part of this mixture passes through passage 30 into pocket 28 as indicated by the arrow in Fig. 2. Ignition initially occurs in pocket 28 and the burning gases pass through opening 32 into the main combustion chamber and produce combustion of the combustible mixture in the main combustion chamber.

It is common in heaters of this type to provide the hot wire igniter 34 with a thermostatic control which cuts out the igniter after the heater attains normal operating temperature, and it will be understood that my novel heater may be so equipped in accordance with conventional practice. The construction of the combustion chamber is such that combustion will continue after the igniter has been cut out, but where a different type of combustion chamber is used, it may be advantageous to provide the usual reigniter plug for maintaining combustion after the igniter has been disconnected from its source of electricity.

The hot products of combustion produced in the combustion chamber 18 pass from this chamber into the interior of a generally cylindrical heat exchanger 38 having longitudinally extending fins 40 for transferring heat from the hot products of combustion to the ventilating air flowing in the duct 12. The heat exchanger 38 is provided with end walls 42 and 44 which prevent intermingling of the combustion gases with the ventilating air. After the combustion gases have given up their heat to the walls and fins of the heat exchanger, the cooled gases are discharged to atmosphere through an exhaust pipe 46.

Temperature control of the ventilating air is regulated by regulating either the rate of combustion of the heater or by starting and stopping the heater for varying intervals. Such heater regulation is effected by a solenoid valve 48 in the fuel line 22. This valve may be of any usual type of solenoid valve which is biased toward closed position and remains open only as long as electrical current is supplied to the solenoid element of the valve. This valve may be either of the open and close type, which completely cuts off the supply of fuel to the heater when the valve is in closed position, or of the high and low type, which only reduces the flow of fuel to the heater when the valve is in the closed position.

When the heater used is provided with hot wire ignition the valve 48 will ordinarily be of the high and low type which, when in the open position, permits maximum heater operation, and when in the closed position permits only heater operation at a reduced rate of fuel consumption. In the form of my invention illustrated, the solenoid valve 48 is controlled by a thermostatic switch 50 interposed between the valve 48 and a battery 52 or any other suitable source of electrical energy. The switch illustrated is of the Fenwall type comprising a brass tube 54 having closed ends in which are mounted the ends of strips or blades 56 and 58 carrying the switch contacts 60 and 62 respectively. When the switch 50 is cool the contacts are in the position shown, but when the switch reaches the predetermined temperature for which it is set to open, the elongation of the tube 54 straightens out the strips or blades 56 and 58 and causes a separation of the contacts 60 and 62 to break the circuit to the solenoid 48. While the particular type of switch 50 which I have shown and described is inexpensive, rugged and serviceable and forms a very satisfactory switch for heater control, my invention is not limited to use of this particular switch and other types of switches may be substituted if desired.

In the embodiment of Fig. 1, the lower half of the switch 50 is located in the duct 12 and is exposed to the heated ventilating air shortly after this air leaves the fins 40 of the heat exchanger 38. The other or upper half of the switch 50 is exposed to air at atmospheric temperature passing through a bypass pipe 64 having an inlet end 66 located in the duct 12 ahead of the heater 10 and an outlet end 68 located in the duct 12 beyond the heater 10. That portion of the bypass pipe 64 immediately adjacent the switch 50 is preferably cut away, as indicated at 70, to provide an enlarged chamber immediately adjacent the switch 50 which surrounds the entire upper half of this switch. The lower end of the chamber is closed by a plate 72 welded or otherwise secured to that portion of the pipe 64 immediately surrounding the opening 70.

From the foregoing it will be apparent that the control switch 50 is responsive both to the atmospheric temperature and to the temperature of the ventilating air leaving the heater 10 and that this switch responds to the mean of the two temperatures. Therefore, when the atmospheric temperature drops, a higher temperature on the part of the ventilating air leaving the heater is required to cause the switch 50 to open and break the circuit to the solenoid valve 48. On the other hand, when the atmospheric temperature rises, the switch 50 will open when the ventilating air attains a less high temperature. Since the operation of the heater at maximum output will produce a gradual increase in the temperature of the ventilating air leaving the heater to a point beyond that required to open the switch 50 under the lowest atmospheric temperature encountered, it will be apparent that my novel control produces alternate high and low heater operation and that the lengths of the respective rates of operation will be automatically varied to compensate for variations in atmospheric temperature and thereby automatically compensate for the increase in heat loss from the aircraft cabin with lower atmospheric temperatures.

Figure 3:
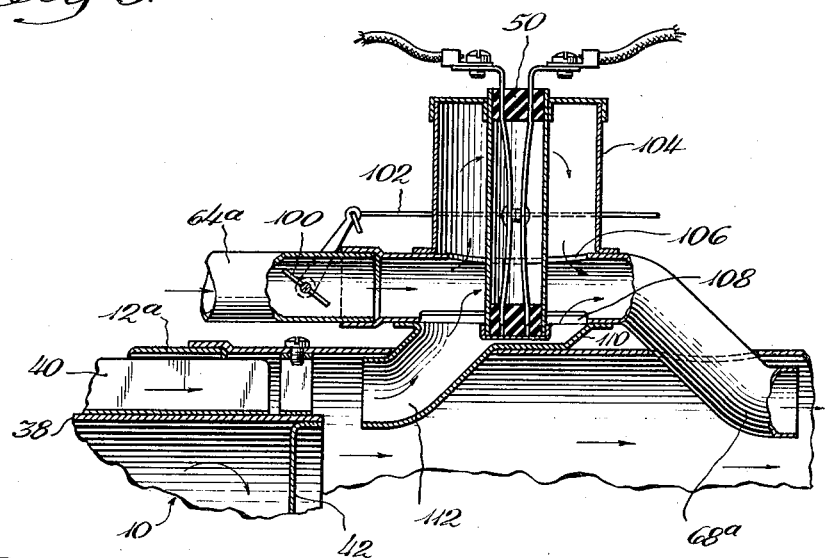
Fig. 3 is a partial longitudinal sectional view of a heater having a modified form of temperature control.

In the embodiment of my invention shown in Figs. 1 and 2, the temperature of the atmospheric air and the temperature of the heated ventilating air have equal influence on the control switch 50. While this particular arrangement is suitable for certain installations and conditions of operation, the operating range of the heater control and the available applications of a given model of heater can be greatly increased by providing some means for regulating and varying the respective influences of the atmospheric temperature and ventilating air temperature on the control switch for the solenoid valve. In the embodiment of Fig. 3 I have provided such means in the form of a throttle valve 100 located in the bypass pipe 64a for the atmospheric air. The position of this butterfly valve 100 can be shifted by means of a wire 102 leading to the cabin or other control point and connected with any suitable manual or thermostatic control.

In the embodiment of Fig. 3 instead of having one section of the switch 50 exposed to the atmospheric air and a separate section of this switch exposed to the heated ventilating air, the entire switch is exposed to a mixture of atmospheric and ventilating air. This is accomplished by mounting the switch 50 in a cylinder 104 mounted on the bypass pipe 64a and communicating therewith through an opening 106. The bypass pipe 64a is also provided with a second opening 108 through which the lower end of the switch 50 extends. A plate 110 is attached to the pipe 64a around the opening 108 and has a ventilating air inlet 112 extending into the ventilating air duct 12a and serving as a means for supplying heated ventilating air to the cylinder 104 and adjacent portion of the bypass pipe 64a. After the mixture of atmospheric air and ventilating air has come in contact with the switch 50, this mixture is delivered to the interior of the ventilating air duct 12a through the outlet end 68a of the atmospheric air bypass pipe.

Figure 4:
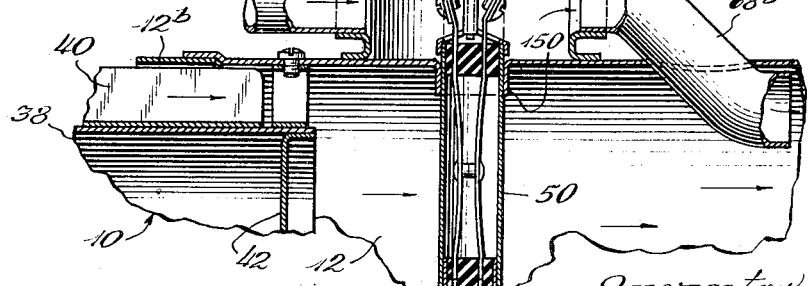
Fig. 4 is a view similar to Fig. 3 but showing a further modification of the temperature control mechanism.

In Fig. 4 I have shown a somewhat different arrangement for controlling the relative influence of the atmospheric air and heated ventilating air on the control switch for the solenoid valve 48. In the embodiment of Fig. 4, the control switch 50 is slidably mounted in an opening 150 formed in a wall of the ventilating air duct 12b. Adjacent this opening a cylinder 152 having a closed upper end 154 is attached to the ventilating air duct 12b in such manner that the switch 50 can be lifted into this cylinder either partly or wholly, as indicated in dotted lines in Fig. 4. Atmospheric air is delivered to the interior of the cylinder 152 by an atmospheric air bypass pipe 64b and returned to the ventilating air duct by way of a second pipe 68b.

The cylinder 152 has openings in which are inserted insulating grommets 156 surrounding the wires which respectively connect the switch 50 with the solenoid valve 48 and the battery 52 or other source of electrical current. The switch 50 is raised or lowered by a rod or wire 158 passing through a suitable opening in the top 154 of the cylinder 152 and operated by any suitable manual or automatic control.

While it is customary to provide the hot wire igniter circuit with a thermostatic control for breaking this circuit after the heater has reached operating temperature to thereby reduce current consumption and prolong the life of the hot wire igniter, such as thermostatic control could be omitted and under these circumstances the solenoid valve 48 could be of the on-and-off type. However, where an on-and-off type of solenoid valve is to be used, it is preferable to provide the heater with a continuously operating type of spark ignition, such, for example, as that disclosed in Patent 2,443,556 granted on June 15, 1948, to Gordon J. Fairbanks, for heaters.

The drawings and specification of this application illustrate and describe specifically only three forms of my invention, but it is to be understood that my invention is not limited to these particular forms but may assume numerous other forms, and it is to be understood that my invention includes all modifications, variations and alternatives coming within the scope of the appended claims.

I claim:

1. Apparatus of the class described comprising a duct supplied with air from a suitable source, an internal combustion heater located in said duct for heating air flowing in said duct, a bypass for unheated air around said heater, a fuel supply pipe for said heater, means for varying the flow of fuel in said pipe, and a single switch for controlling said means, said switch having a part located in said bypass and exposed to unheated air flowing therethrough, and a second part located in said duct and exposed to air heated by said heater.

2. Apparatus of the class described comprising a duct supplied with air from a suitable source, an internal combustion heater located in said duct for heating air flowing in said duct, a bypass for unheated air around said heater, a fuel supply pipe for said heater, means for varying the flow of fuel in said pipe and a single switch for controlling said means, said switch having a part located in said bypass and exposed to unheated air flowing therethrough and a second part located in said duct and exposed to air heated by said heater, and means for shifting said switch to vary the relative influences of heated and unheated air thereon.

3. A sealed internal combustion type heater comprising a ventilating air duct, an internal combustion heater located in said duct for heating air flowing in the duct, a fuel pipe for supplying fuel to said heater, a valve for varying the supply of fuel to said heater, means forming a bypass for unheated air around said heater including an inlet in said duct opening in an upstream direction relative to said heater and an outlet downstream of the heater, and a temperature responsive switch for controlling said fuel supply valve mounted in the wall of said duct downstream of said heater and having a portion projecting into the duct and exposed to the heated air therein and a portion projecting into said bypass forming means and exposed to the unheated air therein.

4. Apparatus of the class described comprising a duct supplied with air from a suitable source, an internal combustion heater located in said duct for heating air flowing therethrough, means forming a bypass for unheated air around said heater including a part having a common wall with a portion of the duct downstream of said heater, said common wall having an opening therein, a fuel supply pipe for said heater, means for varying the flow of fuel in said pipe, and a single temperature responsive switch mounted in the opening in said common wall for movement bodily relative thereto to vary the portion of the switch subject to the heated air in said duct and the unheated air in said bypass means.

5. Apparatus of the class described comprising a duct supplied with air from a suitable source, an internal combustion heater located in said duct for heating air flowing therethrough, means forming a bypass for unheated air around said heater including a part having a common wall with a portion of the duct downstream of said heater, said common wall having an opening therein, a fuel supply pipe for said heater, means for varying the flow of fuel in said pipe, a temperature responsive switch mounted in the opening in said common wall for movement bodily relative thereto to vary the portion of the switch exposed to the heated air in said duct and the unheated air in said bypass means, and means connected to said switch and projecting from said bypass means at a position for manipulation manually to shift the position of said switch.

SEYMOUR E. HEYMANN.

REFERENCES CITED

The following references are of record in the file of this patent:

UNITED STATES PATENTS

| Number | Name | Date |
| --- | --- | --- |
| 1,022,188 | Geissinger | Apr. 2, 1912 |
| 1,558,848 | Doble | Oct. 27, 1925 |
| 1,981,679 | Stem | Nov. 20, 1934 |
| 2,309,295 | Barnes | Jan. 26, 1943 |
| 2,386,807 | Leslie | Oct. 16, 1945 |

FOREIGN PATENTS

| Number | Country | Date |
| --- | --- | --- |
| 473,298 | Great Britain | Oct. 11, 1937 |